United States Patent [19]
Hoshino et al.

[11] Patent Number: 5,493,452
[45] Date of Patent: Feb. 20, 1996

[54] LENS RETAINING BARREL

[75] Inventors: Yoshiharu Hoshino, Okaya; Yoshio Aoki, Nagano, both of Japan

[73] Assignee: Olympus Optical Company Limited, Japan

[21] Appl. No.: 189,292

[22] Filed: Jan. 31, 1994

Related U.S. Application Data

[63] Continuation of Ser. No. 784,984, Oct. 30, 1991, abandoned.

[30] Foreign Application Priority Data

Oct. 31, 1990 [JP] Japan .................................. 2-294417

[51] Int. Cl.$^6$ ........................................................ G02B 7/02
[52] U.S. Cl. .............................................. 359/819; 359/811
[58] Field of Search ............................. 359/808–819, 359/820; 334/286

[56] References Cited

U.S. PATENT DOCUMENTS

| | | | |
|---|---|---|---|
| 4,723,833 | 2/1988 | Yamada | 359/820 |
| 4,725,126 | 2/1988 | Siga | 350/252 |
| 4,778,252 | 10/1988 | Filho | 350/252 |
| 4,812,015 | 3/1989 | Iizuka | 350/252 |
| 5,024,509 | 6/1991 | Kurihara | 359/819 |
| 5,050,963 | 9/1991 | Murakami | 359/808 |

FOREIGN PATENT DOCUMENTS

| | | | |
|---|---|---|---|
| 230277 | 7/1987 | European Pat. Off. | 359/819 |
| 97106 | 6/1984 | Japan | 359/819 |
| 195206 | 11/1984 | Japan | 359/808 |
| 5215 | 1/1986 | Japan | 359/819 |
| 84615 | 4/1986 | Japan | 359/819 |
| 160408 | 7/1987 | Japan | 359/819 |
| 110503 | 4/1990 | Japan | 359/819 |
| 174526 | 7/1991 | Japan | 359/819 |

*Primary Examiner*—Georgia Y. Epps
*Assistant Examiner*—Ricky Mack
*Attorney, Agent, or Firm*—Ostrolenk, Faber, Gerb & Soffen

[57] ABSTRACT

A lens retaining barrel includes a cylindrical part for radially positioning a lens and an abutment for positioning the lens in the direction of the optical axis of the lens. The cylindrical part has a multiplicity of protrusions uniformly and circumferentially spaced around the interior thereof such that a circle inscribed within the protrusions has the same diameter as the outer diameter of the lens and has its center coincident with the optical axis of the lens. The abutment extends radially inwardly a greater extent than the protrusions and has a multiplicity of seats uniformly and circumferentially spaced around the abutment for receiving the lens. The seats have tops defining an envelope extending in a direction orthogonal to the optical axis of the lens. The lens is retained in position by each protrusion of the cylindrical part and each top of the seats and is adhered to the lens retaining barrel by an adhesive. By virtue of this construction, the lens retaining barrel is free from any eccentricity or tilt of the lens, has a higher mounting accuracy, and is easy to assemble for mounting.

21 Claims, 7 Drawing Sheets

LENS RETAINING BARREL

This is a continuation of application Ser. No. 784,984 filed Oct. 30, 1991 now abandoned.

BACKGROUND OF THE INVENTION

1. Field of the Invention

The present invention relates to a lens retaining barrel which is capable of retaining a lens so that the axis of the barrel is coincident with the optical axis of the lens.

2. Description of the Related Arts

Recently plastic molded parts have been used as lens retaining barrels to a considerable extent. FIG. 17 shows a conventional lens retaining barrel 100 which is molded out of plastic and includes a cylindrical part 101 into which a lens L is fitted and an abutment 102 provided inside the cylindrical part 101.

The cylindrical part 101 is adapted to be in contact with the lens outer periphery to position the lens L in the radial direction, while the abutment 102 is brought into contact with the lens L inserted into the cylindrical part 101 to thereby position the lens L in the direction of the optical axis thereof. The lens L inserted into the cylindrical part 101 is rigidly retained within the lens retaining barrel by means of adhesive or caulking.

A mold for molding such a lens retaining barrel 100 can be assembled by inserting an insert into a matrix. The outside part of the lens retaining barrel 100 is molded with the matrix while the inside part of the lens retaining barrel 100 is molded with the insert. In other words, the inner surface of the cylindrical part 101 and the abutment 102 are to be molded with the aid of the insert. When molding by the use of such mold, close attention has to be paid to the shapes and thickness of mold components and, the position of a resin injection gate so as not to cause a deformation in the lens retaining barrel, that is, so as not to bring about an eccentricity or tilt of the lens at the time of mounting the lens.

However, in spite of the closest attention on molding and an enhanced accuracy of the mold such as the insert, it is difficult to entirely eliminate the deformation of the lens retaining barrel to be molded. When a lens requiring a higher centering accuracy is mounted into such barrel, the deformation often causes the reduction in the mounting accuracy. The concrete causes are supposed to be based on the following two items.

(1) Eccentricity of Lens

The inner surface (lens fitting portion) of the cylindrical part 101 into which the outer periphery of the lens L is fitted is deformed, and the center of the inscribed circle of the lens fitting portion is deviated from the optical axis of the lens L. This causes an eccentricity of distance δ as shown in FIG. 17a.

(2) Tilt of Lens

A receiving surface of the abutment 102 in the direction of the optical axis is not allowed to be orthogonal to the optical axis of the lens due to the deformation. As a result, the lens is tilted by angles $\epsilon_1$, $\epsilon_2$ as shown in FIG. 17b.

In order to cope with the above two causes, conventionally the diameter of the lens fitting portion, that is, the outer diameter of the insert, was set somewhat larger in view of the eccentricity of the lens fitting portion, and troublesome assembling works were needed such as adjusting the abutting condition of the abutment against the receiving surface at the time of mounting the lens, which requires considerable practice.

The present invention was conceived in view of the above problems, and aims to provide a lens retaining barrel free from any eccentricity or tilt of the lens and having a higher mounting accuracy and being easy to assemble for mounting.

SUMMARY OF THE INVENTION

In order to achieve the above objects, the inventor has found through a hard study that the deformed direction and the deformed amount of the molded part by the insert having the same diameter for molding the inner surface of the cylindrical part of the lens retaining barrel are constant. Based on this fact, the inventor has invented that a correction is imparted to the insert in the direction where the deformation in the molded part caused by the insert having the same diameter is corrected, and the molding is carried out while maintaining the molding condition at the time of correcting the insert constant, whereby a lens retaining barrel free from eccentricity or tilt of the lens can be molded.

The thus configured lens retaining barrel in accordance with the present invention comprises a cylindrical part for radially positioning the lens and an abutment for positioning the lens in the direction of the optical axis, characterized in that:

(1) At respective positions dividing the cylindrical part into at least three segments, there is provided protrusions whose inscribed circle has the same diameter as the outer diameter of the lens and has the center resting on the optical axis of the lens;

(2) At respective positions dividing the abutment into at least three segments, there is provided seats the envelope of whose tops is orthogonal to the optical axis of the lens; and (3) The lens is retained in position by means of each protrusion of the cylindrical part and each top of the abutment.

In the above structure, the cylindrical part of the lens retaining barrel is coaxial with the optical axis of the lens, and the lens receiving surface is orthogonal to the optical axis of the lens, thereby ensuring an extremely high mounting accuracy of the lens to be loaded therein and retained. The present invention was conceived in view of the above problems, and aims to provide a lens retaining barrel free from any eccentricity or tilt of the lens and which has a high mounting accuracy and which is easy to assemble for mounting.

DESCRIPTION OF THE PREFERRED EMBODIMENTS

Figure 1:
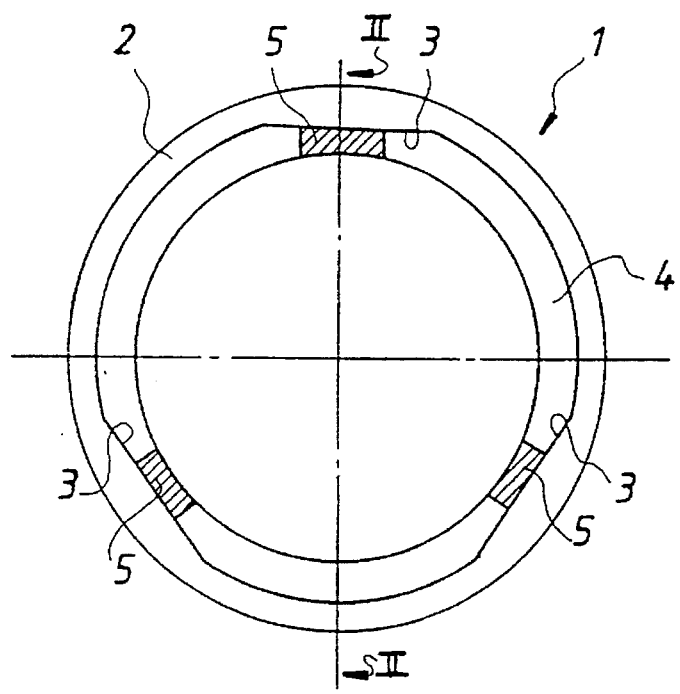
FIGS. 1 and 2 are a front view showing a first embodiment of the lens retaining barrel in accordance with the present invention, and a sectional view taken along a line II—II thereof, respectively.

Concrete description will now be made of embodiments illustrating the present invention. In each embodiment, identical elements are correspondingly designated by the same reference numerals, to thereby avoid the repetition of the same description.

(First Embodiment)

Figure 2:
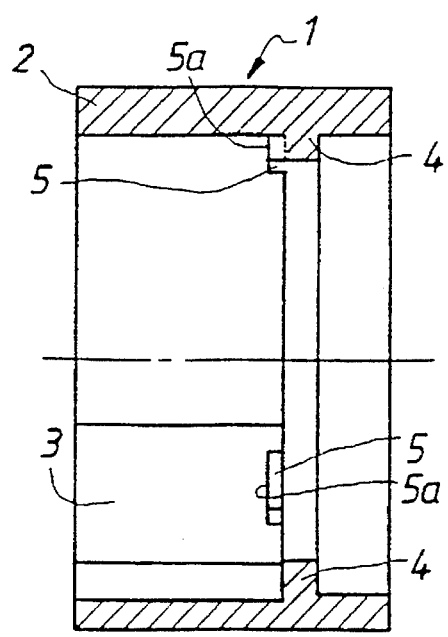

FIGS. 1 to 5 show a first embodiment of the present invention, in which FIGS. 1 and 2 are a front view of a lens retaining barrel 1, and a sectional view taken along the line II—II thereof, respectively.

Figure 4A:
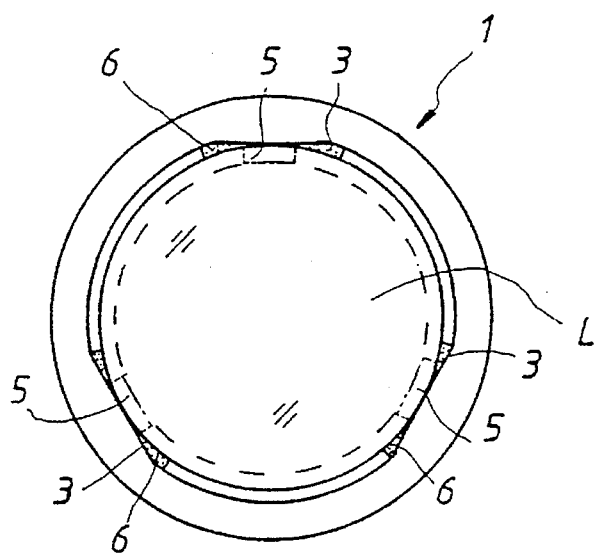
FIGS. 4a and 4b are a front view showing the state where the lens is mounted, and a sectional view thereof, respectively.

The lens retaining barrel 1 includes a frame or cylindrical part 2 having an axis substantially coaxial with an optical axis of a lens. The cylindrical part 2 has a cylindrical inner wall having an open forward end for receiving the lens and has a somewhat larger inner diameter than the outer diameter of the lens (for example, on the order of 0.5 mm larger in diameter). At circumferentially trisected positions of the cylindrical part 2 are provided protrusions 3. The protrusions 3, which are string-like planar protrusions in this embodiment, are brought into contact with the outer periphery of the lens introduced into the cylindrical part 2 at the trisected positions of the lens (Refer to FIG. 4*a* as shown in FIG. 4*a*, the radial innermost parts of the protrusions 3 lie on a circular locus which corresponds to a circular inscribed within the protrusions 3. The protrusions 3 are dimensioned in such a manner that the inscribed circle thereof has the same diameter as the outer diameter of the lens, and are formed so that the center of the inscribed circle lies on the optical axis of the lens. In this case, as long as the protrusions 3 are formed on the above conditions, the lens is free from any eccentricity even though the center of the cylindrical part 2 is deviated from the optical axis of the lens.

Further, an annularly projected abutment 4 is provided on the inner periphery of the cylindrical part 2. As best shown in FIG. 1, the projected abutment 4 extends radially inwardly from the inner wall of the cylindrical part 2 a greater extent than the protrusions 3. The abutment 4 axially positions the lens in the direction of the optical axis thereof, and at circumferentially trisected positions of the abutment 4 are axially extending abutments which terminate in seats 5 for receiving the lens in the optical axis direction. The seats 5 are configured in such a manner that the envelope of the tops or forward most parts 5*a* thereof is orthogonal to the optical axis of the lens. Stated otherwise, the topes or forwardmost parts 5*a* lie in a common plane which is orthogonal to the optical axis of the lens. In this embodiment, each seat 5 is located correspondingly with the string-like protrusions 3 of the cylindrical part 2.

Figure 3:
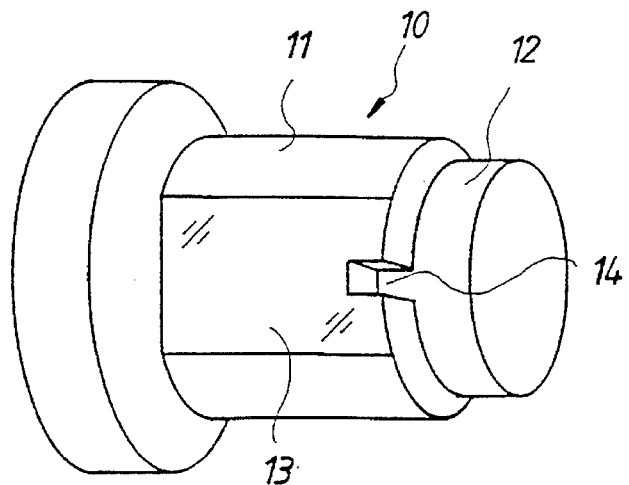
FIG. 3 is a perspective view of an insert used for molding the lens retaining barrel.

FIG. 3 shows an insert 10 for molding the lens retaining barrel 1. The insert 10 has a cylindrical large diameter portion 11 for shaping the inner surface of the cylindrical part 2 of the lens retaining barrel 1, and a small diameter portion 12 for shaping the inner surface of the abutment 4. The large diameter portion 11 includes planar parts 13 for shaping the string-like protrusions 3 of the lens retaining barrel 1 at its trisectioned positions. Moreover, the planar parts 13 have at one end adjacent to the small diameter portion 12 grooves 14 for configuring the seats 5.

A process for making the insert 10 will be described hereinafter.

First, the insert 10 is impressed with a marking or the like at a position specified with respect to a matrix (not shown) for molding the outer periphery of the cylindrical part 2 of the lens retaining barrel 1 so that the position where the matrix is combined with the insert is always fixed. At that time, the large diameter portion 11 and the small diameter portion 12 of the insert 10 each have cylindrical contours, and the planar parts 13 and grooves 14 have not yet been formed thereon.

Next, trisected positions of the large diameter portion 11 are subjected to surface grinding. In the initial surface grinding, the inscribed circle is formed larger than the outer diameter of the lens, and through the repetition of molding a directional property of the deformation is found out based on the molded part each time molding is carried out. Then the grinding volume of each surface grinding is gradually varied in accordance with the deformation amount, thereby correcting the planar parts 13 in such a manner the inscribed circle has the same diameter as the outer diameter of the lens. Such correction can be easily executed only by surface grinding the outer surface of the insert 10 and grinding in the direction where the deformation due to the molding is merely corrected.

Following such formation of the planar parts 13, grooves 14 are formed on the end of the planar parts 13 adjacent to the small diameter portion 12. Also upon the formation of the grooves 14, through the repetition of trial and error, the metal mold is gradually adjusted so that the envelope of the tops of the seats 5 is finally orthogonal to the optical axis of the lens. This correction for the metal mold can also be easily performed as the correction amount can be judged due to finding of the deformational direction of the seats 5. By the use of the thus corrected insert 10 and on the basis of molding conditions on correction, the above-mentioned lens retaining barrel 1 can be molded.

Figure 4B:
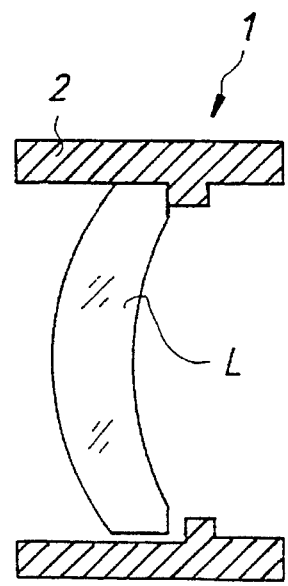

FIG. 4 shows the state where a lens L is mounted into the lens retaining barrel 1 formed in this manner. In the illustrated example, a meniscus lens is used as the lens L. When the lens L is inserted into the cylindrical part 2, three outer peripheral parts thereof are fitted and engaged with the string-like protrusions 3 while the planar part of the lens L abuts against the seats 5, whereby the lens is positioned and retained within the cylindrical part 2 by virtue of the protrusions 3 and the seats 5. Further, in this retaining condition, the center of the inscribed circle of the protrusions 3 lies on the optical axis of the lens L, and accordingly the lens L is free from eccentricity. Also the envelope of the tops of the seats 5 is orthogonal to the optical axis of the lens L, and hence the lens L is not allowed to be inclined.

In such a retaining state, the farther from the abutting portion, the gap between the lens L and the protrusions 3 becomes larger, owing to the arcuate shapes of the protrusions 3. In FIG. 4 (*a*), reference numeral 6 denotes an adhesive applied from both sides of the part where the protrusion 3 is in contact with the lens. As the adhesive 6 used is a silicone series adhesive having a lower viscosity of the order of 200 poise, which is allowed to permeate the contacting surface of the lens L simultaneously with the injection due to the capillary phenomenon and to flow also in the direction of the optical axis to reach the abutment 4. In addition, the adhesive has an elasticity after hardening, and hence the lens L is permitted to ensure the adhesion area in the state where the optical axis is coincident with the axis of the lens retaining barrel 1 and to be steadily retained without any displacement.

If the lens L is a glass lens, it has a small dimensional displacement arising from variation in temperature, whereas the lens retaining barrel which is molded out of plastic causes a large dimensional deformation due to variation in temperature. This deformation is caused in the vicinity of the string-like protrusions 3, but due to a follow-up deformation of the adhesion 6 around the protrusions 3, the adhesive strength is prevented from lowering and the optical axis of the lens is free from the displacement. This ensures a satisfactory response to the variation in temperature.

Also, in the above embodiment, the outer diameter of lens L is the same as the diameter of the inscribed circle of the protrusions 3. However, the outer diameter of the lens may be about 0.03 mm larger than the inscribed circle as the lens retaining barrel 1 is a plastic molded part and capable of increasing its diameter at the time of insertion of the lens L, and hence there arise no dimensional problems.

On the contrary, the outer diameter of the lens may be approximately 0.02 mm smaller than the inscribed circle as the optical axis of the lens is coincident with the axis of the lens retaining barrel due to the permeation of the adhesive 6. Moreover, the protrusions 3 and the seats 5 may be provided at positions divided into three or more equal parts, to retain the lens.

Figure 5A:
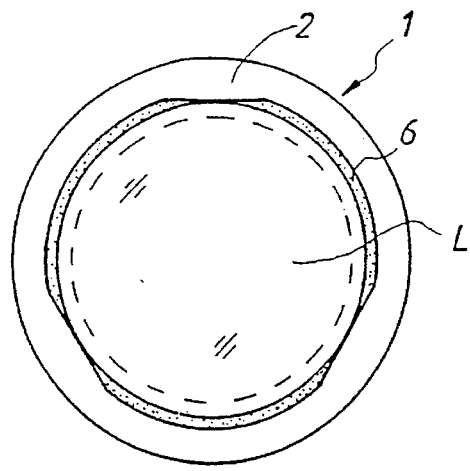
FIGS. 5a and 5b are a front view showing a variant of an adhesive, and a sectional view thereof, respectively.
Figure 5B:
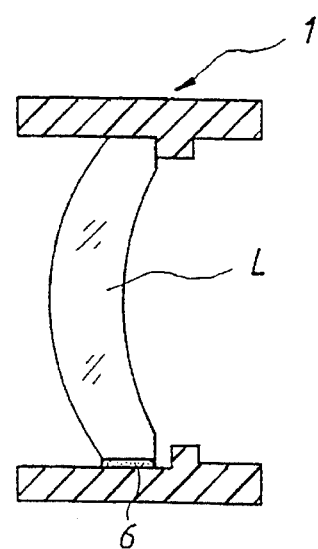
Figure 6:
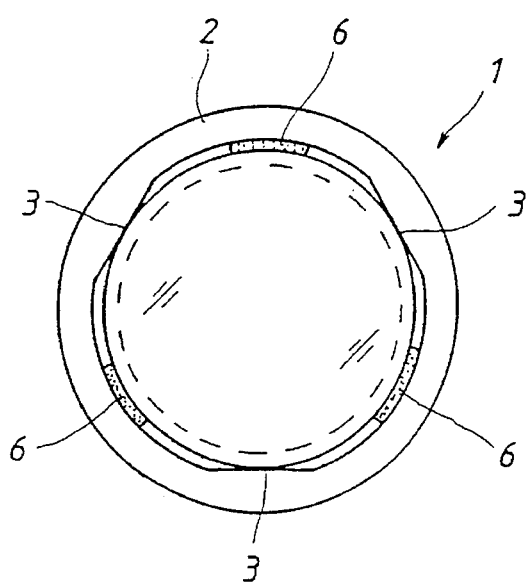
FIGS. 6 and 7 are a front view showing another variant of the adhesive, and a sectional view thereof, respectively.
Figure 7:
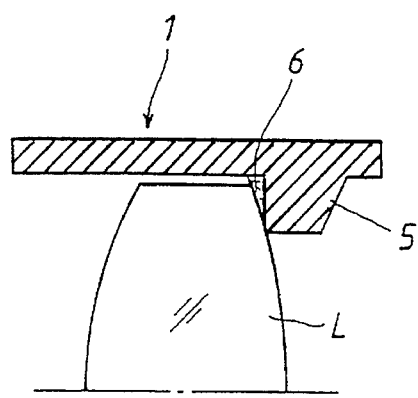

FIGS. 5 to 7 show a modification of adhesion by means of adhesive 6.

In an example as shown in FIG. 5, the adhesive 6 is applied to the entire periphery of the lens L, thereby securing a higher mounting accuracy of the lens and conferring waterproof properties. In an example as shown in FIG. 6, the adhesive 6 is applied between the inner surface of the cylindrical part 2 and the outer surface of the lens L, to thereby facilitate the injection of the adhesive 6. Also in an example as shown in FIG. 7, the adhesive 6 is applied between the lens L and the seats 5, to conveniently prevent the flow of the adhesive 6.

Figure 8:
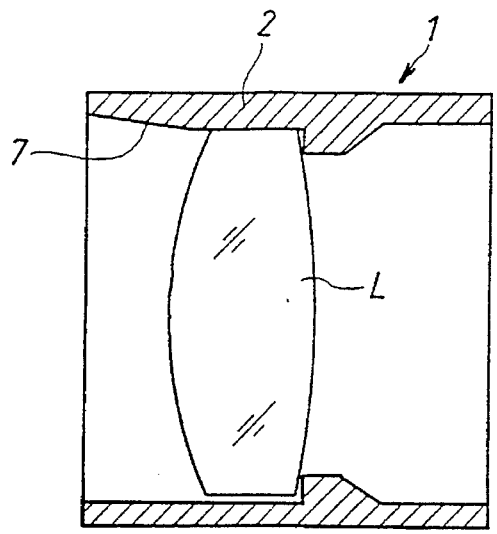
FIGS. 8 and 9 are sectional views respectively showing variants of the cylindrical part.
Figure 9:
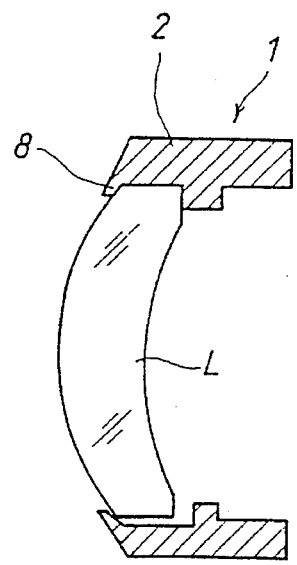

FIG. 8 shows an example in which a tapered guide surface 7 is provided in the opening of the cylindrical part 2 to be loaded with the lens L, to thereby facilitate the insertion of the lens. Furthermore, FIG. 9 shows an example in which the open end of the cylindrical part 2 loaded with the lens L is heat-caulked to form a caulking portion 8, resulting in no use of adhesive.

Figure 10A:
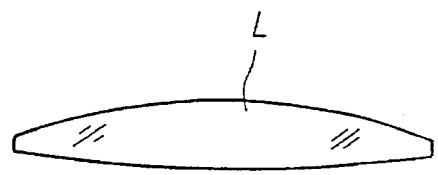
FIGS. 10*a* to 10*c* are lateral views showing variants of the lens.
Figure 10B:
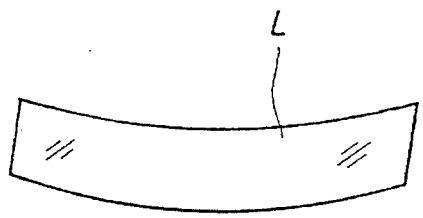
Figure 10C:
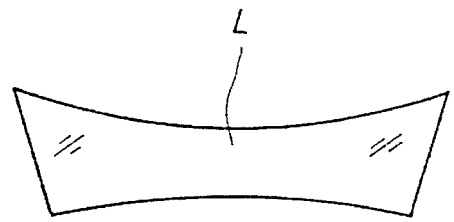

FIG. 10 shows actual examples of the lens L, in which FIG. 10a show a thin lens, and FIGS. 10b and 10c each show a case where the outer peripheral contour is deviated from the optical axis. The present invention can also retain these lens L with a high mounting accuracy.

(Second Embodiment)

Figure 11:
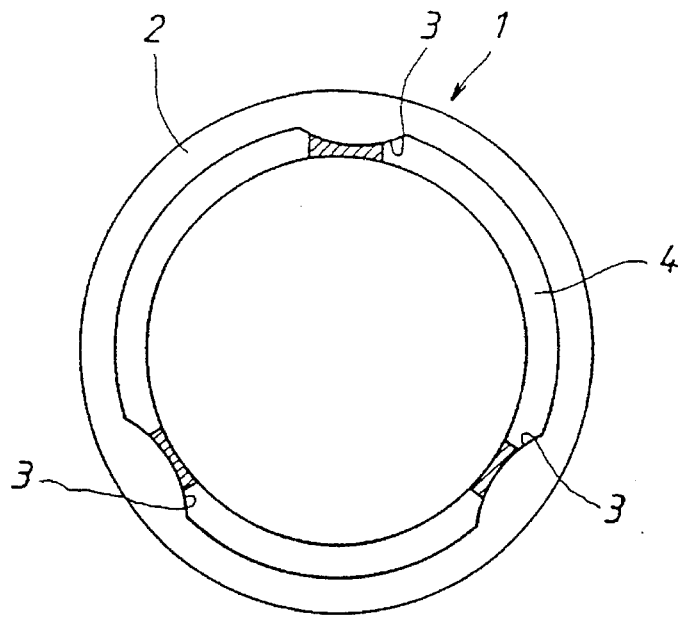
FIGS. 11 and 12 are a front view showing a second embodiment of the present invention, and a partial perspective view thereof, respectively.
Figure 12:
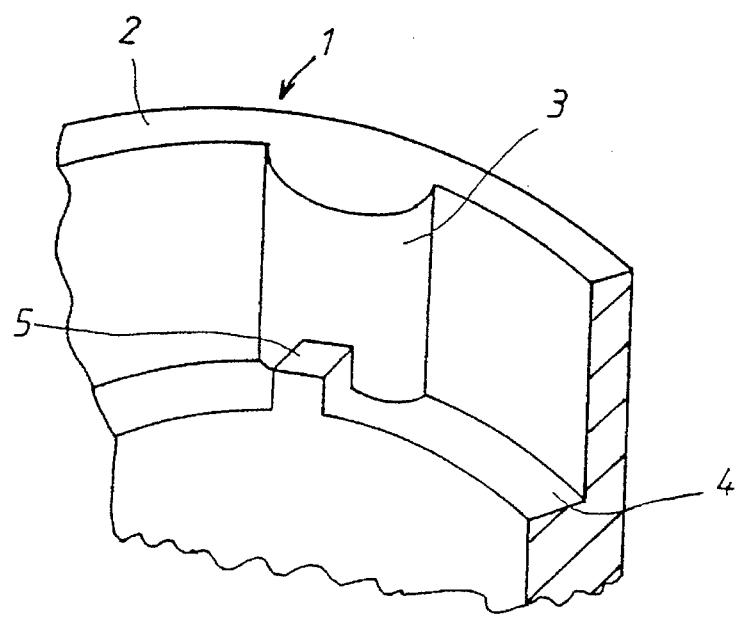

FIGS. 11 and 12 show a second embodiment of the present invention.

In the second embodiment, protrusions 3 within a cylindrical part 2 are each fashioned into an arcuate shape. This presents a merit to facilitate the dimensional control of the inscribed circle as the tops of the seats 5 are identified more clearly.

Figure 13:
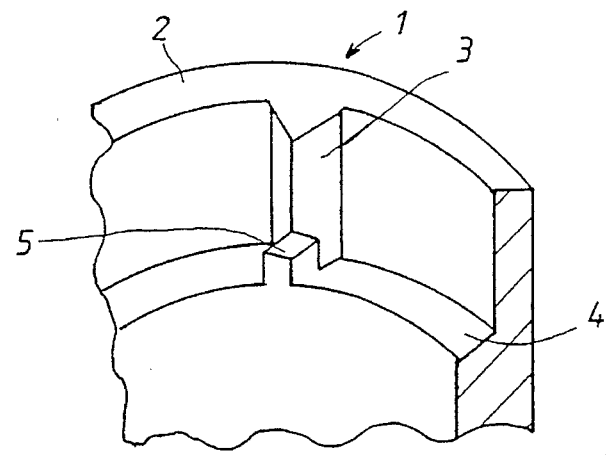
FIG. 13 is a partial perspective view showing a variant thereof.

It should be noted that the shape of the protrusions 3 is not confined to an arc, instead a, triangular shape as shown in FIG. 13 may be employed to obtain similar effects.

(Third Embodiment)

Figure 14:
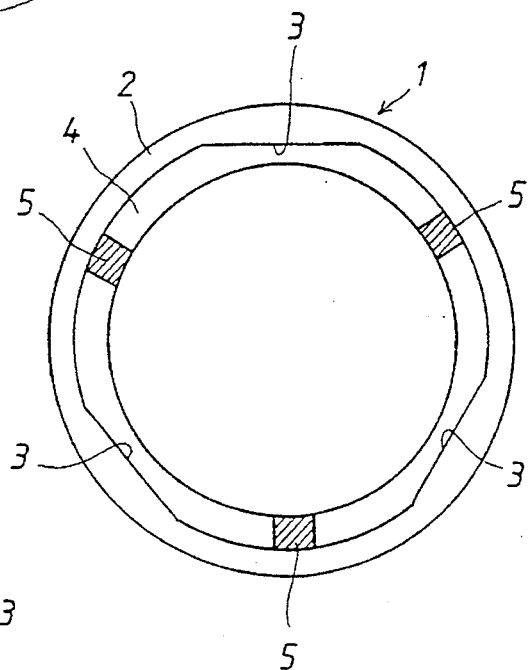
FIGS. 14 and 15 are a front view showing a third embodiment of the present invention, and a partial perspective view thereof.
Figure 15:
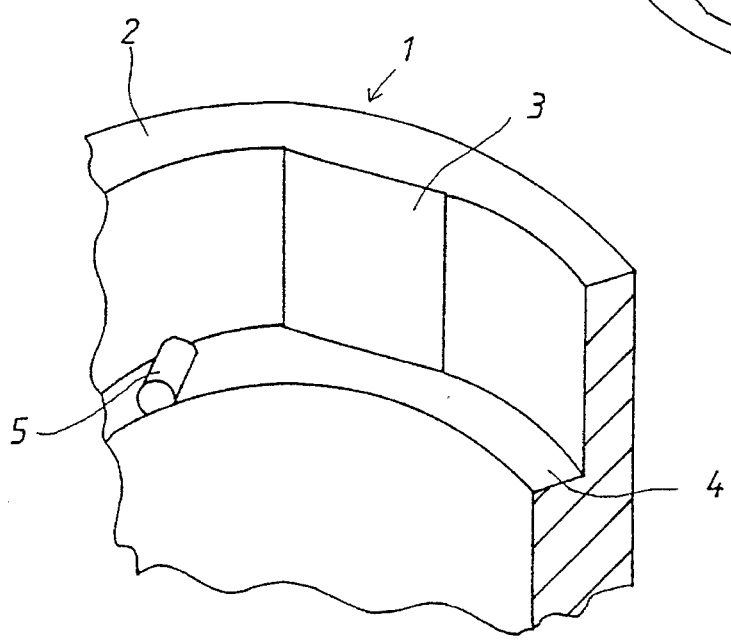

FIGS. 14 and 15 show a third embodiment of the present invention, in which the arcuate protrusions 3 of the cylindrical part 2 are molded at different angular positions around the cylindrical part from the seats 5 of the abutment 4. Also, the seats 5 are of semi-cylindrical shape.

Figure 16:
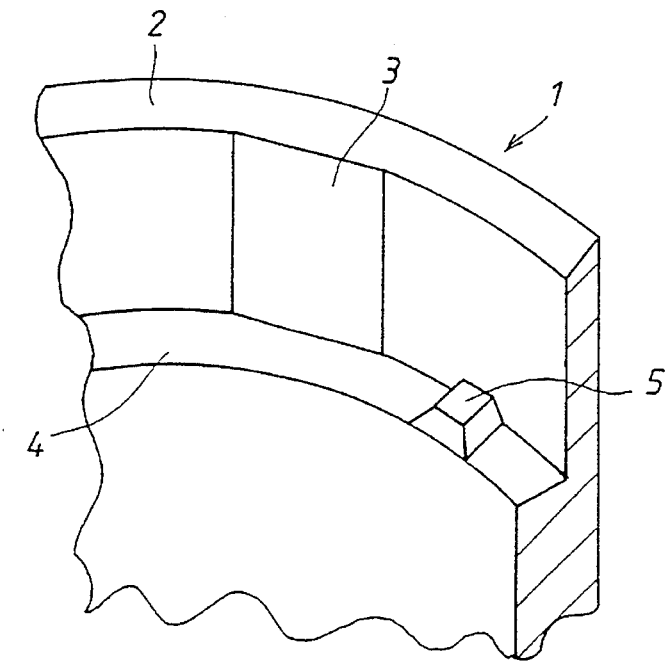
FIG. 16 is a partial perspective view showing a variant thereof.
Figure 17A:
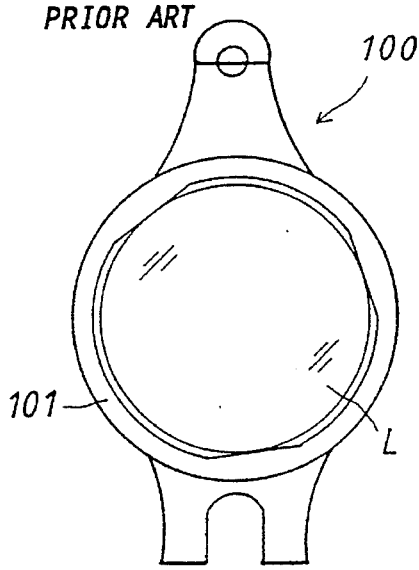
FIGS. 17*a* and 17*b* are a front view showing the conventional example, and a sectional view thereof, respectively.
Figure 17B:
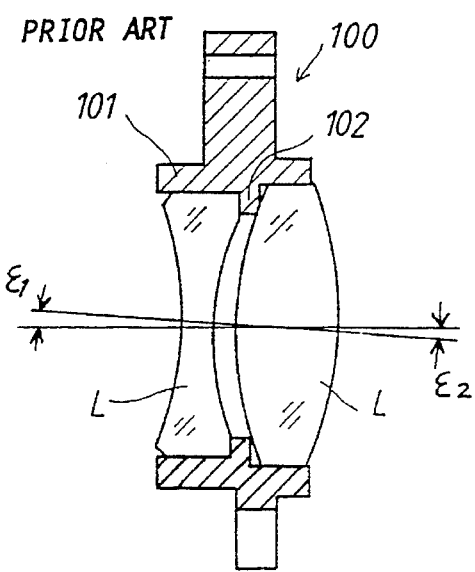

In this embodiment, the three tops of the seats 5 can be clarified, which leads to an easy dimensional control between the envelope and the optical axis of the lens. FIG. 16 shows a variant of the seats 5 which are of trapezoidal shapes. This not only facilitates the dimensional control but also heightens the mounting accuracy due to the enlarged area which is brought into contact with the lens. Besides, the shape of the seats 5 in the third embodiment is also applicable to the first and second embodiments.

In addition, as with the embodiment described above with reference to FIGS. 1–5, the abutment 4 in the second and third embodiments extends radially inward from the inner wall of the cylindrical part 2 a greater extent than the protrusions 3, as shown in FIGS. 11–12 and 14–15, respectively.

What is claimed is:

1. A lens rotating barrel comprising:

a cylindrical part for radially positioning a lens;

at least one abutment extending annularly from said cylindrical part for positioning the lens relative to a direction of an optical axis of the lens, said cylindrical part having a plurality of protrusions uniformly and circumferentially spaced around an interior thereof such that a circle inscribed within the protrusions has a diameter that is substantially the same as an outer diameter of the lens and has a center coincident with the optical axis of the lens, said at least one abutment extending radially inwardly a greater extent than the protrusions and having a plurality of seats uniformly and circumferentially spaced therearound for receiving thereon the lens, the seats having upper surfaces defining an envelope expanding in a direction substantially orthogonal to the optical axis of the lens, whereby the lens is retained in position by means of each of said plurality of protrusions of said cylindrical part and each of said upper surfaces of said seats; and an adhesive located between the lens retaining barrel and the lens for securely holding the lens in the lens retaining barrel, the adhesive having a viscosity that enables the adhesive to permeate the lens and having resiliency when cured to achieve follow-up deformation to accurately maintain a position of the optical axis of the lens relative to the lens retaining barrel.

2. A lens retaining barrel according to claim 1; including at least three protrusions and at least three seats.

3. A lens retaining barrel according to claim 1; wherein the adhesive is applied between the lens and each protrusion of the cylindrical part.

4. A lens retaining barrel according to claim 1, wherein the adhesive is located between an inner peripheral surface of the cylindrical part and an outer peripheral surface of the lens.

5. A lens retaining barrel according to claim 1; wherein the adhesive is applied between the lens and the seats.

6. A lens retaining barrel according to claim 1; wherein the interior of the cylindrical part has a tapered guide surface which tapers inwardly in the direction of insertion of the lens into the lens retaining barrel.

7. A lens retaining barrel according to claim 1; wherein the protrusions all have the same size and shape.

8. A lens retaining barrel according to claim 1; wherein the seats all have the same size and shape.

9. A lens rotating barrel according to claim 1, wherein the adhesive is a silicon system adhesive.

10. A lens holder for holding a lens, comprising:

a frame having a cylindrical wall defining a cylindrical opening and having forward and rearward ends for receiving a lens inserted axially through the forward end of the cylindrical wall into the cylindrical opening, the cylindrical wall having a plurality of circumferentially spaced protrusions protruding radially inwardly therefrom for radially positioning the lens within the cylindrical opening, the radial innermost parts of the protrusions lying on a circular locus having a diameter which is substantially the same as the outer diameter of the lens, and a plurality of abutments extending radially inwardly a greater extent than the protrusions and disposed within and circumferentially spaced around the cylindrical opening for axially positioning the lens therein, the axial forwardmost parts of the abutments lying in a plane which is substantially orthogonal to the optical axis of the lens; and an adhesive located between the lens retaining barrel and the lens for securely holding the lens in the lens retaining barrel, the adhesive having a viscosity that enables the adhesive to permeate the lens and having resiliency when cured to achieve follow-up deformation to accurately maintain a position of the optical axis of the lens relative to the lens retaining barrel.

11. A lens holder according to claim 10; wherein the abutments are located at the same angular positions around the cylindrical opening as the protrusions.

12. A lens holder according to claim 11; including at least three protrusions and at least three abutments.

13. A lens holder according to claim 10; wherein the abutments and protrusions are located at different angular positions from one another around the cylindrical opening.

14. A lens holder according to claim 13; including at least three protrusions and at least three abutments.

15. A lens holder according to claim 10; wherein the protrusions extend axially of the cylindrical wall from the front end thereof to the abutments.

16. A lens holder according to claim 15; wherein the cylindrical wall has an annular abutment portion extending circumferentially around the cylindrical opening, the abutments extending axially of the annular abutment portion and having forwardmost parts which define lens seats engageable with the lens.

17. A lens holder according to claim 16; wherein the lens seats have a flat shape.

18. A lens holder according to claim 16; wherein the lens seats have an arcuate shape.

19. A lens holder according to claim 16; wherein the cylindrical wall tapers inwardly in the direction from the forward to the rearward end thereof.

20. A lens holder according to claim 10; wherein the cylindrical wall tapers inwardly in the direction from the forward to the rearward end thereof.

21. A lens rotating barrel according to claim 10, wherein the adhesive is a silicon system adhesive.

\* \* \* \* \*